(12) United States Patent
Tuneld et al.

(10) Patent No.: US 9,734,379 B2
(45) Date of Patent: Aug. 15, 2017

(54) GUIDED FINGERPRINT ENROLLMENT

(71) Applicant: FINGERPRINT CARDS AB, Göteborg (SE)

(72) Inventors: Mats Tuneld, Lund (SE); Hamid Sarvé, Göteborg (SE); Kenneth Jonsson, Kungälv (SE); Stefan Printz, Malmö (SE); Chao Chen, Lund (SE)

(73) Assignee: FINGERPRINT CARDS AB, Göteborg (SE)

( * ) Notice: Subject to any disclaimer, the term of this patent is extended or adjusted under 35 U.S.C. 154(b) by 47 days.

(21) Appl. No.: 14/833,968

(22) Filed: Aug. 24, 2015

(65) Prior Publication Data
US 2016/0063298 A1 Mar. 3, 2016

(30) Foreign Application Priority Data
Sep. 3, 2014 (SE) ...................... 1451024

(51) Int. Cl.
*G06K 9/00* (2006.01)

(52) U.S. Cl.
CPC ..... *G06K 9/00013* (2013.01); *G06K 9/00026* (2013.01); *G06K 9/00912* (2013.01); *G06K 9/00067* (2013.01)

(58) Field of Classification Search
CPC ........... G06K 9/00006; G06K 9/00026; G06K 9/00067; G06K 9/00087; G06K 9/036; G06K 9/0008; G06K 9/00073; G06K 9/00912; G06K 7/081; G06K 9/00053; G06K 9/00093; G06K 9/00382; G06K 9/00013; G06F 21/32; G06F 2203/0338; G06F 3/0488; G06F 21/36; G06F 3/03547; H04L 63/0861; A61B 5/1172
See application file for complete search history.

(56) References Cited

U.S. PATENT DOCUMENTS

| | | | |
|---|---|---|---|
| 5,828,773 A | 10/1998 | Setlak et al. | |
| 6,795,569 B1 | 9/2004 | Setlak | |
| 2009/0310831 A1* | 12/2009 | Zhang | G06K 9/00073 382/125 |
| 2010/0303311 A1 | 12/2010 | Shin et al. | |
| 2011/0286640 A1* | 11/2011 | Kwon | G06K 9/00026 382/124 |

(Continued)

FOREIGN PATENT DOCUMENTS

WO 9846114 A2 10/1998

OTHER PUBLICATIONS

PCT International Search Report and Written Opinion dated Dec. 2, 2015 for PCT International Application No. PCT/SE2015/050927 (19 pages).

*Primary Examiner* — Kenny Cese
(74) *Attorney, Agent, or Firm* — Remarck Law Group PLC

(57) ABSTRACT

Fingerprint enrollment is described. An initial procedure in which the appropriate area of the finger is determined from the size of a user's finger, followed by a guidance procedure where guidance information is provided in a pseudo random manner and further fingerprint data is obtained during the pseudo random guidance. When the appropriate area of the finger has been covered, fingerprint data is used in a calculation of fingerprint enrollment data that can be used in subsequent steps in the enrollment procedure.

18 Claims, 4 Drawing Sheets

(56) References Cited

U.S. PATENT DOCUMENTS

| | | | |
|---|---|---|---|
| 2013/0234825 A1* | 9/2013 | Malhotra | A61B 5/1172 340/5.53 |
| 2013/0259330 A1 | 10/2013 | Russo et al. | |
| 2014/0003677 A1 | 1/2014 | Han et al. | |
| 2014/0003678 A1 | 1/2014 | Vieta et al. | |
| 2014/0003679 A1 | 1/2014 | Han et al. | |
| 2014/0294259 A1* | 10/2014 | Lee | G06K 9/033 382/124 |
| 2015/0074615 A1* | 3/2015 | Han | G06K 9/00033 715/863 |

\* cited by examiner

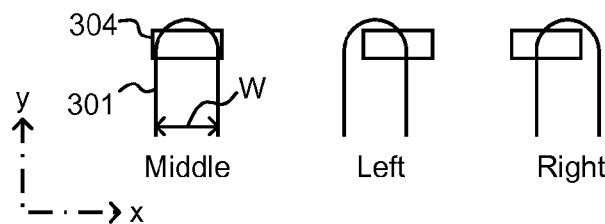
*Fig. 3a*
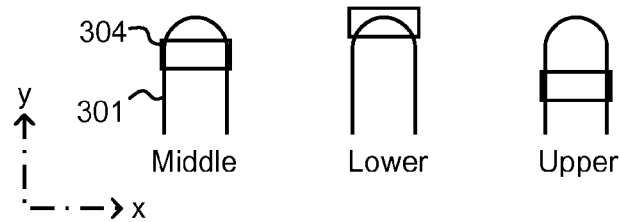
*Fig. 3b*
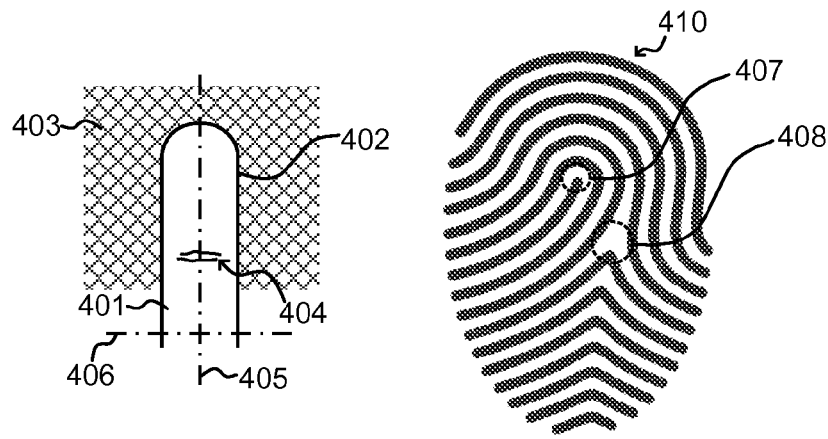
*Fig. 4a*  *Fig. 4b*
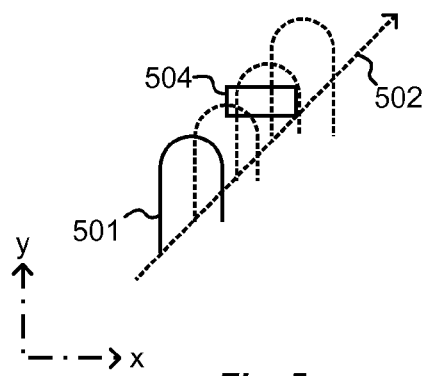
*Fig. 5*

GUIDED FINGERPRINT ENROLLMENT

CROSS-REFERENCE TO RELATED APPLICATIONS

This application claims the benefit of Swedish Patent Application No. 1451024-2, filed Sep. 3, 2014. The disclosure of the above application is incorporated herein by reference in its entirety.

TECHNICAL FIELD

Embodiments herein relate to methods and arrangements relating to enrolment of fingerprints in a fingerprint sensing system.

BACKGROUND

In the field of biometric sensing, the use of fingerprints has evolved to be one of the most widely used technologies. This fact can be illustrated and exemplified by considering the field of mobile communication technology, e.g. the use of intelligent mobile devices such as smartphones. In this field there is an increased demand for providing increased security for accessing the devices themselves and also for providing secure access to remote services such as banking services that are available via data communication networks.

In order to enable such secure access by way of fingerprint sensing, a user has to take part in a so-called enrolment procedure where information directly connected to a user's fingerprint is registered for later use in a matching procedure when actual access is to be determined. During such an enrolment procedure, the user is typically prompted to apply a finger to a fingerprint sensor several times until a complete fingerprint, or at least a large part of a fingerprint, has been recorded.

Examples of prior art fingerprint enrolment are described in US patent application publications 2014/0003677 and 2014/0003679. In the systems described in these publications, during the enrolment procedure, a user is provided with feedback in the form of information that tells the user which part of the fingerprint that is still to be recorded.

However, there are drawbacks with prior art enrolment procedures. For example, in previous known enrolment methods there are no good ways to generate progress information, neither a user friendly way to collect the required number of images that is needed for a successful enrolment.

SUMMARY

In order to mitigate at least some of the drawbacks as discussed above, there is provided in a first aspect of embodiments herein a method in a fingerprint sensing system. The fingerprint sensing system comprises a two-dimensional fingerprint sensor and the method comprises a number of steps that commences with obtaining initial fingerprint data. Based on the initial fingerprint data, a finger size of a finger of a user is then calculated. Based on the finger size, an appropriate area of the finger is then calculated for obtaining fingerprint enrolment data.

A plurality of finger positions is obtained, where the finger positions are in relation to the sensor. Position guidance information is provided to the user, for guiding the user to position the finger in relation to the sensor according to the finger positions. The provision of the position guidance information is performed such that the finger positions are indicated to the user in a pseudo random order.

While providing the position guidance information, further fingerprint data is obtained from the sensor until an amount of fingerprint data has been obtained that exceeds a coverage threshold associated with the appropriate area of the finger. Based on any of the initial fingerprint data and the further fingerprint data, the fingerprint enrolment data is then calculated.

In other words, the method can be seen as a two-part procedure comprising an initial procedure in which the appropriate area of the finger is determined from the size of the user's finger, followed by a guidance procedure where guidance information is provided in a pseudo random manner and further fingerprint data is obtained during the pseudo random guidance. When the appropriate area of the finger has been covered, fingerprint data is used in a calculation of fingerprint enrolment data that can be used in subsequent steps in the enrolment procedure. (It is to be noted that such subsequent steps, e.g. user identity verification, database recording etc., are not part of the present disclosure.)

This two-part procedure has a number of advantages. For example, since the appropriate area of the finger, which is based on the size of the finger (which varies highly between individual users), is used in the guided obtaining of the further fingerprint data, the number of times the obtaining of the further fingerprint data must be performed can be minimized. This enables a quick enrolment procedure.

Furthermore, by providing the guidance information in a pseudo random manner, one and the same finger position is not repeated in a predictable way, so that whenever the user is directed to a specific position, the user will apply the finger at a position that is not exactly the same position. In that way it is possible to cover the appropriate area of the finger quicker than if the guidance procedure was to be started in a certain position and then guiding the user to move in a predictable pattern using (as is typical in prior art) small steps.

In various embodiments, the obtaining of the initial fingerprint data comprises obtaining finger data from a touch sensitive two dimensional display. In such embodiments, the calculation of the finger size is based on the obtained finger data.

In other embodiments, the obtaining of the initial fingerprint data comprises obtaining the initial fingerprint data from the sensor. In these embodiments, a plurality of initial fingerprint data is obtained that correspond to at least a left position of the finger in relation to the sensor, a middle position of the finger in relation to the sensor and a right position of the finger in relation to the sensor. Based on the obtained plurality of initial fingerprint data, a finger width of the finger is calculated, and the calculation of the finger size is then based on the calculated finger width.

Alternatively, initial fingerprint data that correspond to an upper position and a lower position of the finger in relation to the sensor can be obtained instead of the left and right positions. A spatial measure that is essentially perpendicular to a finger width of the finger is then used in the calculation of the finger size.

In some embodiments, the plurality of initial fingerprint data are stitched, resulting in a stitched fingerprint image. Based on the stitched fingerprint image, a calculation is made of directions of stitching associated with the plurality of initial fingerprint data. Differences between the respective calculated directions of stitching are then calculated. The calculation of the finger size then comprises setting the finger size to a default finger size if at least one of said differences between the respective calculated directions of stitching is larger than a direction threshold value.

That is, in some of these embodiments the user is guided to position the finger in a plurality of positions (e.g. 3 or more positions) in order to obtain a measure of the width of the finger. At the same time, the initial fingerprint data, e.g. in the form of images, is stitched together and a relative direction of the stitching is calculated. This direction information is then used to determine if the user is a "bad user" or a "potential good user" by considering the differences in the stitching directions; large differences means a "bad user" and small differences means a "potential good user". After these initial fingerprint data, e.g. images, have been collected, and if it is determined that the user is a "potentially good user", the estimated finger width is used to calculate the finger size. In case the user is determined to be a "bad user" a default finger size is used instead.

In a second aspect there is provided a fingerprint sensing system that comprises a fingerprint sensor, a processor and a memory. The memory contains instructions executable by the processor whereby the processor is operative to control the fingerprint sensing system by:

obtaining initial fingerprint data, calculating, based on the initial fingerprint data, a finger size of a finger of a user, calculating, based on the finger size, an appropriate area of the finger for obtaining fingerprint enrolment data, obtaining a plurality of finger positions, the finger positions being in relation to the sensor, providing, to the user, position guidance information for guiding the user to position the finger in relation to the sensor according to the finger positions, wherein the provision of the position guidance information is performed such that the finger positions are indicated to the user in a pseudo random order, obtaining, while providing the position guidance information, further fingerprint data from the sensor until an amount of fingerprint data has been obtained that exceeds a coverage threshold associated with the appropriate area of the finger, and calculating, based on any of the initial fingerprint data and the further fingerprint data, the fingerprint enrolment data.

In further aspects there are provided a communication device comprising the fingerprint sensing system of the second aspect, a computer program, comprising instructions which, when executed on at least one processor in a fingerprint sensing system, cause the fingerprint sensing system to carry out the method according to the first aspect and, in a final aspect, a carrier comprising the computer program.

Effects and advantages of these further aspects correspond to those summarized above in connection with the first aspect.

DETAILED DESCRIPTION

Figure 1A:
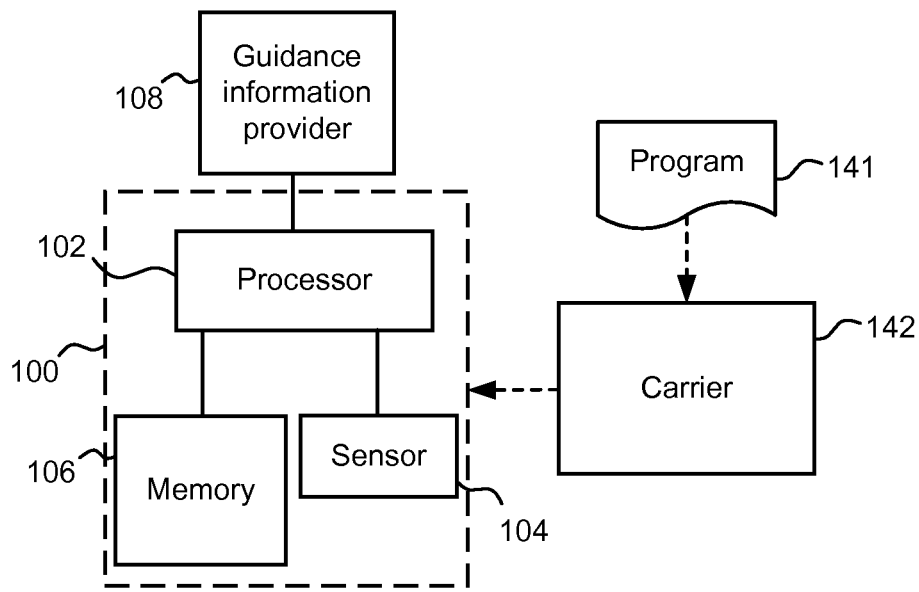
FIG. 1a schematically illustrates a block diagram of a fingerprint sensing system, FIG. 1b schematically illustrates a block diagram of a mobile communication device.

FIG. 1a illustrates schematically in the form of function blocks a fingerprint sensing system 100. The function blocks comprise a processor 102, a two-dimensional fingerprint sensor 104 and a memory 106, and the system 100 is in connection with a guidance information provider 108. The processor is operable to control the fingerprint sensing system 100 and it is connected to the memory 104, which comprises an appropriate computer program 141 comprising software instructions and data that enables the processor 102 to control the system 100 as will be exemplified below. With regard to the fingerprint sensor 104 it may be of any suitable type, such as optical, capacitive, ultrasonic etc. and it may also form part of a touch sensitive display, as the skilled person will realize. The fingerprint sensor 104 may comprise a matrix of pixels, for example a capacitive sensor having a size of 208×80 pixels, each pixel having a resolution of 256 grey scales. The fingerprint sensor typically comprises a readout circuit (not shown in the drawings) allowing the image data, i.e. fingerprint data, to be read out to the processor 102 at various speeds.

The fingerprint sensing system 100 may comprise individual components as illustrated schematically in FIG. 1a and the system may also be implemented by way of combining functionalities of the processor 102 and the memory 106 in a single unit. It is also possible to have an implementation where the sensor 104 comprises the necessary processor and memory capabilities.

With regard to the guidance information provider 108, it is an arrangement that is capable of providing a feedback to a user when the user interacts with the fingerprint sensing system 100. Although feedback will be exemplified with visual output in the form of graphics in the following, it is to be noted that the feedback from the guidance information provider 108 may be an arrangement that is capable of providing sensory output that is any of visual, sound and touch.

Figure 1B:
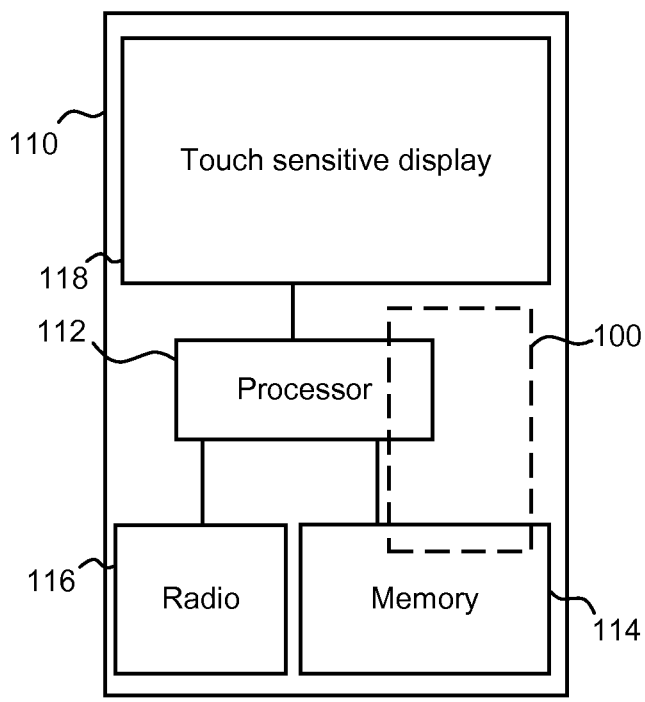

FIG. 1b illustrates schematically in the form of function blocks a mobile communication device 110 such as a mobile phone, a smartphone, a tablet, a personal computer, a laptop computer or any similar type of device. The mobile communication device 110 comprises the functionalities of the fingerprint sensing system 100 of FIG. 1a. The mobile communication device 110 comprises a processor 112, a memory 114, radio circuitry 116 and a touch sensitive display 118. As indicated in FIG. 1b, the fingerprint sensing system 100 forms part of the processor 112 and the memory 114 and connects to the touch sensitive display 118. That is, the processor 112 controls by means of software instructions the fingerprint sensing system 100 as will be exemplified below. The touch sensitive display 118 is configured to act as the guidance information provider 108 by providing graphical output for a user during operation of the fingerprint sensing system 100. Needless to say, the processor 112 is configured to control the mobile communication device to operate in a mobile communication system via the radio circuitry 116 in a manner that is outside the scope of the present disclosure.

Figure 2:
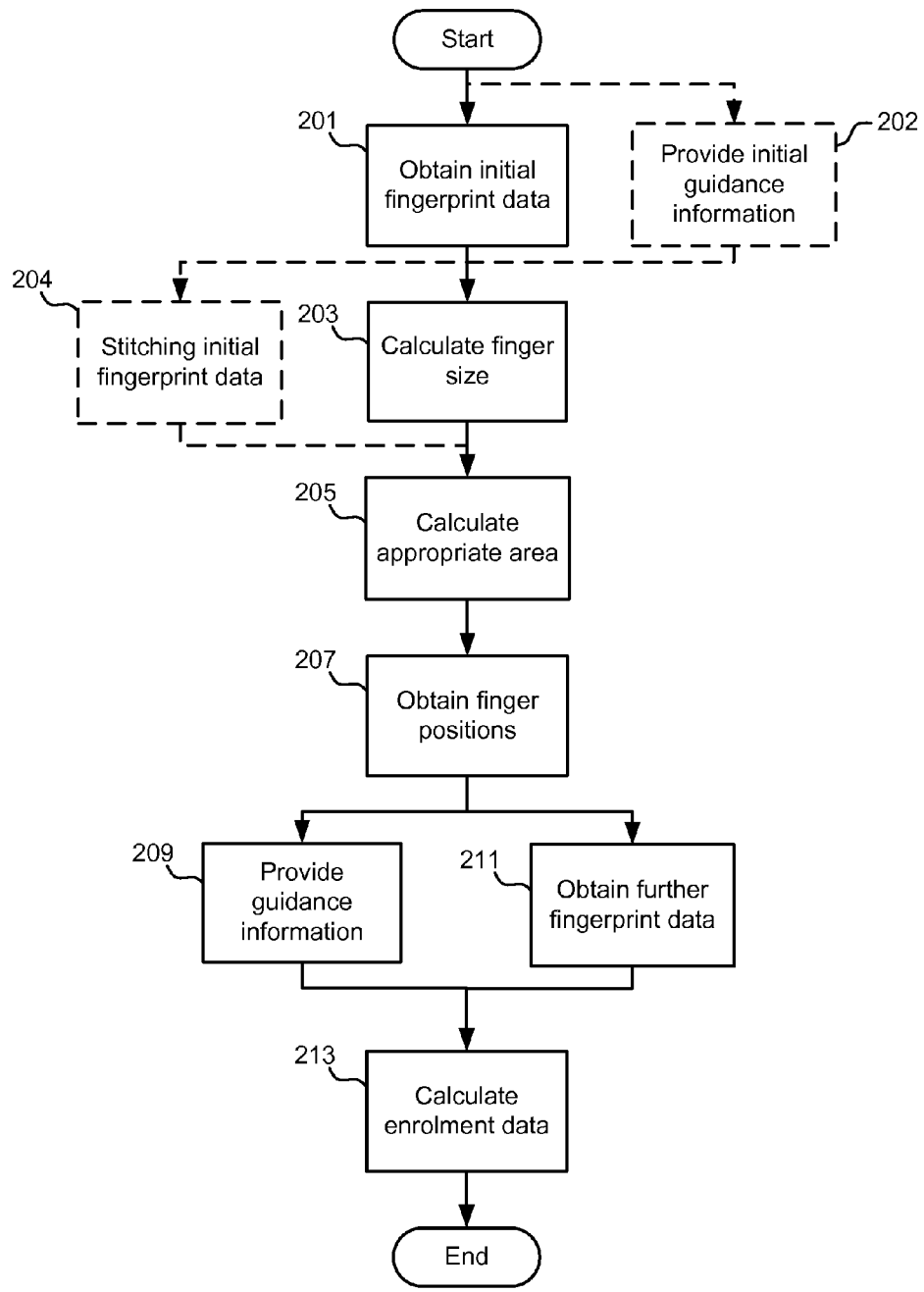
FIG. 2 is a flowchart of method steps, FIGS. 3a and 3b schematically illustrate finger positions in relation to a sensor, FIG. 4a schematically illustrates a finger, FIG. 4b schematically illustrates a fingerprint, FIG. 5 schematically illustrates swiping guidance information, FIGS. 6a and 6b schematically illustrate stitched images and associated directions, and FIG. 7 schematically illustrates position guidance information.

Turning now to FIG. 2 and with continued reference to FIGS. 1a and 1b, a method in a fingerprint sensing system, e.g. the fingerprint sensing system 100 of FIGS. 1a and 1b, will be described in some detail. The method comprises a number of actions that will be described below. The actions of the method in FIG. 2 are realized by means of software instructions being executed in a processor, e.g. the processor 102 or the processor 112, which interacts with a sensor such as the sensor 104 and controls provision of guidance information, e.g. via a guidance information provider 108. Memory such as the memory 106 or the memory 114 is utilized during the execution of the method.

Action 201

Initial fingerprint data is obtained. In some embodiments, the initial fingerprint data is obtained from the sensor.

In some embodiments where the initial fingerprint data is obtained from the sensor, a plurality of initial fingerprint data is obtained that correspond to at least a left position of a finger in relation to the sensor, a middle position of the finger in relation to the sensor and a right position of the finger in relation to the sensor. This is illustrated in FIG. 3a where a finger 301 is schematically illustrated at a middle position, a left position and a right position in relation to a sensor 304. Alternatively, as illustrated in FIG. 3b, a plurality of initial fingerprint data is obtained that correspond to at least an upper position of the finger 301 in relation to the sensor 304, a middle position of the finger 301 in relation to the sensor 304 and a lower position of the finger 301 in relation to the sensor 304. Here, a spatial measure that is essentially perpendicular to a finger width is indicated by reference W'.

In other embodiments, the initial fingerprint data is obtained from finger data from a touch sensitive two dimensional display, e.g. in embodiments where the fingerprint sensing system 100 is comprised in a device such as the mobile communication device 110.

In various embodiments, the obtaining of the initial fingerprint data may comprise obtaining fingerprint characteristics in the form of any of at least one distance between at least two fingerprint reference points, a spatial frequency of fingerprint ridges and valleys, a number of fingerprint minutiae, a measure of fingerprint valley curvature, a measure of fingerprint ridge curvature etc. In such embodiments, the calculation of the finger size (action 203, which will be described in detail below) comprises a calculation using any of the obtained fingerprint characteristics Action 202

Initial position guidance information may in some embodiments be provided to the user for guiding the user to position the finger in the middle position in relation to the sensor and, subsequently, providing, to the user, initial position guidance information for guiding the user to position the finger in any of the left, the right, the upper and the lower position in relation to the sensor. For example, this guidance information may entail displaying graphics that may look like the schematically illustrated finger 301 and sensor 304 in FIGS. 3a and 3b.

Alternatively, the initial position guidance information may be provided to the user for guiding the user to swipe the finger in relation to the sensor. For example, this guidance information may entail displaying graphics that may look like the schematically illustrated finger 501, swiping direction 502 and sensor 504 in FIG. 5.

Action 203

Based on the obtained initial fingerprint data, a finger size of a finger of a user is calculated.

In the embodiments where the initial fingerprint data is obtained from a sensor and where the initial fingerprint data correspond to a middle, a left and a right position of the finger in relation to the sensor, a finger width of the finger is calculated based on the obtained plurality of initial fingerprint data. The calculation of the finger size is then based on the calculated finger width. Alternatively, in the embodiments where the initial fingerprint data is obtained from a sensor and where the initial fingerprint data correspond to a middle, an upper and a lower position of the finger in relation to the sensor, a spatial measure that is essentially perpendicular to a finger width of the finger is calculated based on the obtained plurality of initial fingerprint data. The calculation of the finger size is then based on the calculated spatial measure that is essentially perpendicular to a finger width.

The finger width and the measure that is essentially perpendicular to a finger width may be obtained by measuring distances between reference-points in a fingerprint. This is exemplified in FIGS. 4a and 4b where examples of reference points comprise boundary points 402 between a background 403 and fingerprint pattern 410 of a finger 401, or internal features in the fingerprint pattern 410, such as large-scale features including core 407, delta 408 and joint between phalanges 404.

For example, the finger width may be calculated as $W=(x\_max-x\_min)*r$, where $x\_min$ and $x\_min$ is the spatial position of the segmented fingerprint (i.e., the non-fingerprint background is neglected) in the horizontal direction x and r is the pixel resolution of the fingerprint sensor (a typical value is 50 μm). This approach assumes that the finger is not rotated during the obtaining of the initial fingerprint data.

With regard to the embodiments where the spatial measure that is essentially perpendicular to a finger width is used, a corresponding calculation of finger size may comprise the same considerations as for the case where the width is used, i.e. related to statistics on the relationship between inter-feature distances and finger size.

In the embodiments where the initial fingerprint data is obtained from finger data from a touch sensitive two dimensional display, the calculation of the finger size is based on the obtained finger data. For example, from the finger data, extraction may be done of a contour using the boundary points 402 of the fingerprint pattern 410. The principal or major axis 405 of the finger 401 may be determined from the contour and the major axis 405 gives the direction of the finger. The finger width may be determined from the intersection of the minor axis 406 (which is orthogonal to the major axis 405) and the contour.

Alternatively, the width of a finger can be estimated by using initial fingerprint data that comprise a sequence of images of two sliding neighbouring fingers that are starting out as separated and sequentially gets closer to each other until they are touching and no longer are separated. The finger width may then be estimated from the distance between e.g., reference-points located along the major axis 405 of the fingers or other points appearing consistently within the finger area, which are straight forward to obtain from existing application programming interfaces.

Action 204

Figure 6A:
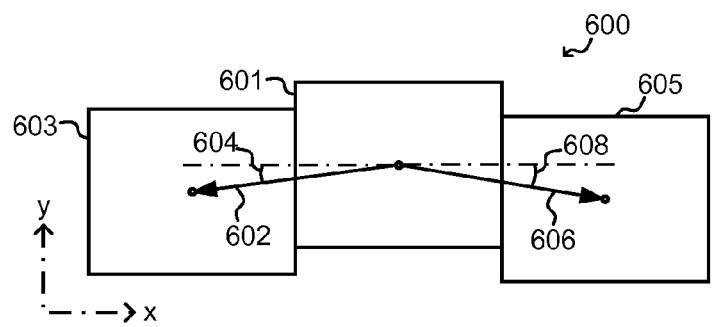
Figure 6B:
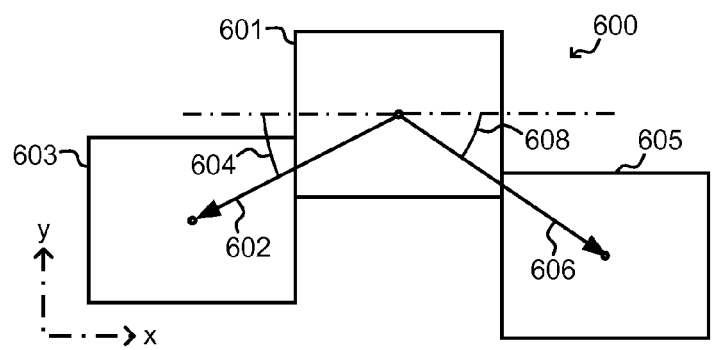

In some embodiments, as illustrated in FIGS. 6a and 6b, the plurality of initial fingerprint data is stitched resulting in a stitched fingerprint image 600 comprising three images 601, 603 and 605. Based on this stitched fingerprint image, directions 602, 606 of stitching associated with the plurality of initial fingerprint data are calculated. In FIGS. 6a and 6b, these directions of stitching 602, 606 are defined by respective angles 604, 608 in relation to an x axis. Differences between the respective calculated directions of stitching 602, 606 are determined, and the calculation of the finger size (action 203) then comprises setting the finger size to a default finger size if at least one of said differences between the respective calculated directions of stitching 602, 606 is larger than a direction threshold value.

For example, a condition for performing the finger size calculation may be based on the following parameters: The plurality of initial fingerprint data, being in the form of images, are found to be adjacent, i.e. all stitched together and the direction of stitching is approximately linear, the width is more than the direction threshold value (e.g. FingerWidth-Min) and less than a certain threshold (e.g. FingerWidth-Max). If all of these conditions are met then there will be a calculation of finger size that will be the base for calculate the appropriate coverage area (described below). If the condition is not met, there will be a default finger size used.

Action 205

Based on the calculated finger size, an appropriate area of the finger for obtaining fingerprint enrolment data is calculated. As will be described in more detail below, the fingerprint enrolment data essentially comprises unique information regarding the user's fingerprint and thereby enables an enrolment of the user for further use in a fingerprint authentication context.

For example, the appropriate area may be a percentage of the available fingerprint surface that can be registered with a certain number of touches and may be determined from statistics over, e.g., the finger size.

Action 207

Figure 7:
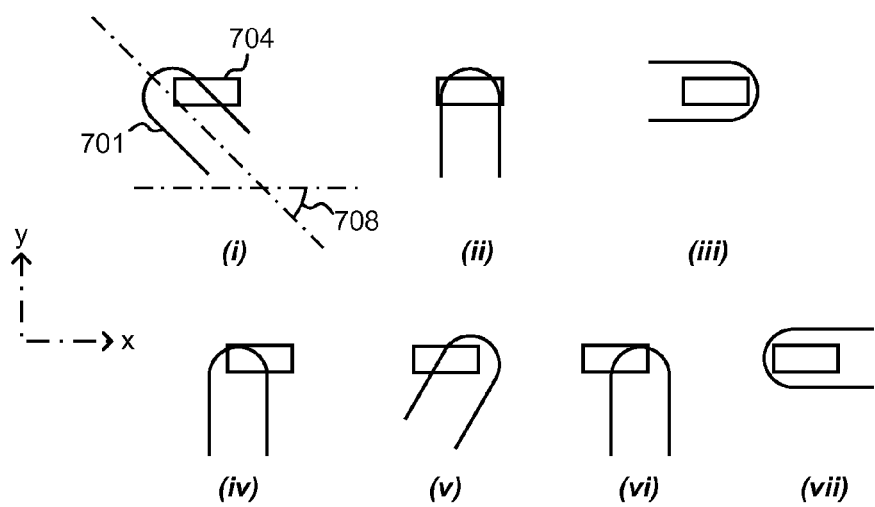

A plurality of finger positions are obtained, these finger positions are in relation to the sensor. For example, the finger positions may comprise information regarding rectangular coordinates relative to a position on the sensor, e.g. as illustrated by the xy-coordinate systems indicated in FIGS. 3 to 6. The finger positions may also comprise information regarding an angle relative to a direction of extension of the sensor, e.g. an angle in relation to the x-direction. FIG. 7 illustrates seven finger positions, denoted with roman numerals (i)-(vii), where the finger 701 is at a respective xy-position and angle 708 in relation to the sensor 704.

Action 209

Position guidance information is provided to the user. The guidance information is for guiding the user to position the finger in relation to the sensor according to the finger positions. The provision of the position guidance information is performed such that the finger positions are indicated to the user in a pseudo random order. As illustrated in FIG. 7, the seven positions (i)-(vii) are not systematic and it is to be stressed that the positions (i)-(vii) are presented, e.g. as graphic representations of fingers such as those in FIG. 7, for the purpose of illustrating a pseudo random order of different positions of the finger 701 in relation to the sensor 704.

Action 211

While providing the position guidance information, further fingerprint data is obtained from the sensor until an amount of fingerprint data has been obtained that exceeds a coverage threshold associated with the appropriate area of the finger.

In some embodiments, based on the plurality of finger positions, a determination is made of a first group of finger positions and a second group of finger positions. In these embodiments, the first group of finger positions is associated with a first estimated likelihood that the coverage threshold is reached within a specific number of steps of obtaining the further fingerprint data and the second group of finger positions is associated with a second estimated likelihood, lower than the first estimated likelihood, that the coverage threshold is reached within the specific number of steps of obtaining the further fingerprint data. In these embodiments, the pseudo random provision of the position guidance information is performed such that the first group of positions is provided prior to provision of the second group of positions. Alternatively or additionally, in these embodiments, the pseudo random provision of the position guidance information is performed such that positions in the first group of positions are provided more frequent than positions in the second group of positions.

In other words, such embodiments involve weighing different positions based on which position is believed to be more likely to provide better coverage of the fingerprint. During the pseudo random guidance, positions in a higher ranked group of positions will be presented prior to, or more frequent than, positions in a lower ranked group of positions. A rationale behind is that the user will finish the enrolment whenever the coverage threshold is reached. By doing so the number of touches from the user (i.e. the number of times the further fingerprint data is obtained) will be decreased with the advantage of a quick enrolment procedure.

During this action, in a case where the coverage threshold is not reached within a reasonable number of touches, e.g. 20, it is feasible to discontinue the guiding (i.e. actions 209 and 211) and continue with action 213 regardless of the obtained fingerprint coverage.

Action 213

Based on any of the initial fingerprint data and the further fingerprint data, the fingerprint enrolment data is calculated.

For example, features that describe the fingerprint are extracted from the individual images (i.e. from any of the initial fingerprint data and the further fingerprint data), and embedded in a data structure typically referred to as a template. Templates may be matched with each other to determine their geometrical inter-relationships, and bring them into a common coordinate system. Moreover, given features in a common coordinate system, the individual images may be stitched to generate a combined image covering the whole sampled finger area, which then may be used in subsequent steps of enrolling the user.

Returning now to FIG. 1a, embodiments of a fingerprint sensing system 100 will be described in some more detail. FIG. 1a illustrates a fingerprint sensing system 100 that comprises a fingerprint sensor 104, a processor 102 and a memory 106, said memory 106 containing instructions executable by said processor 102 whereby said processor 102 is operative to control the fingerprint sensing system 100 by:

obtaining initial fingerprint data, calculating, based on the initial fingerprint data, a finger size of a finger of a user, calculating, based on the finger size, an appropriate area of the finger for obtaining fingerprint enrolment data, obtaining a plurality of finger positions, the finger positions being in relation to the sensor, providing, to the user, position guidance information for guiding the user to position the finger in relation to the sensor according to the finger positions, wherein the provision of the position guidance information is performed such that the finger positions are indicated to the user in a pseudo random order, obtaining, while providing the position guidance information, further fingerprint data from the sensor until an amount of fingerprint data has been obtained that exceeds a coverage threshold associated with the appropriate area of the finger, and calculating, based on any of the initial fingerprint data and the further fingerprint data, the fingerprint enrolment data.

In some embodiments, the processor 102 is operative to control the fingerprint sensing system 100 such that the obtaining of the initial fingerprint data comprises:
obtaining the initial fingerprint data from the sensor.

In some embodiments, the processor 102 is operative to control the fingerprint sensing system 100 such that the obtaining of the initial fingerprint data comprises:
obtaining a plurality of initial fingerprint data that correspond to at least a left position of the finger in relation to the sensor, a middle position of the finger in relation to the sensor and a right position of the finger in relation to the sensor,
calculating, based on the obtained plurality of initial fingerprint data, a finger width of the finger, and wherein the calculation of the finger size is based on the calculated finger width.

In some embodiments, the processor 102 is operative to control the fingerprint sensing system 100 such that the obtaining of the initial fingerprint data comprises:
obtaining a plurality of initial fingerprint data that correspond to at least an upper position of the finger in relation to the sensor, a middle position of the finger in relation to the sensor and a lower position of the finger in relation to the sensor,
calculating, based on the obtained plurality of initial fingerprint data, a spatial measure that is essentially perpendicular to a finger width of the finger, and wherein the calculation of the finger size is based on the spatial measure that is essentially perpendicular to a finger width.

In some embodiments, the processor 102 is operative to control the fingerprint sensing system 100 by:
providing, to the user, initial position guidance information for guiding the user to position the finger in the middle position in relation to the sensor and, subsequently,
providing, to the user, initial position guidance information for guiding the user to position the finger in any of the left, the right, the upper and the lower position in relation to the sensor.

In some embodiments, the processor 102 is operative to control the fingerprint sensing system 100 by:
providing, to the user, initial position guidance information for guiding the user to swipe the finger in relation to the sensor.

In some embodiments, the processor 102 is operative to control the fingerprint sensing system 100 by:
stitching the plurality of initial fingerprint data, resulting in a stitched fingerprint image,
calculating, based on the stitched fingerprint image, directions of stitching associated with the plurality of initial fingerprint data,
determining differences between the respective calculated directions of stitching, and wherein the calculation of the finger size comprises setting the finger size to a default finger size if at least one of said differences between the respective calculated directions of stitching is larger than a direction threshold value.

In some embodiments, the processor 102 is operative to control the fingerprint sensing system 100 such that the obtaining of the initial fingerprint data comprises:
obtaining finger data from a touch sensitive two dimensional display, and wherein the calculation of the finger size is based on the obtained finger data.

In some embodiments, the processor 102 is operative to control the fingerprint sensing system 100 such that the obtaining of the initial fingerprint data comprises:
obtaining fingerprint characteristics in the form of any of:
at least one distance between at least two fingerprint reference points,
a spatial frequency of fingerprint ridges and valleys,
a number of fingerprint minutiae,
a measure of fingerprint valley curvature,
a measure of fingerprint ridge curvature, and wherein the processor 102 is operative to control the fingerprint sensing system 100 such that the calculation of the finger size comprises a calculation using any of the obtained fingerprint characteristics.

In some embodiments, the processor 102 is operative to control the fingerprint sensing system 100 by:
determining, based on the plurality of finger positions, a first group of finger positions and a second group of finger positions, where:
the first group of finger positions is associated with a first estimated likelihood that the coverage threshold is reached within a specific number of steps of obtaining the further fingerprint data, and
the second group of finger positions is associated with a second estimated likelihood, lower than the first estimated likelihood, that the coverage threshold is reached within the specific number of steps of obtaining the further fingerprint data, and wherein the processor 102 is operative to control the fingerprint sensing system 100 such that the pseudo random provision of the position guidance information is performed such that the first group of positions is provided prior to provision of the second group of positions.

In some embodiments, the processor 102 is operative to control the fingerprint sensing system 100 such that the finger positions comprise information regarding rectangular coordinates relative to a position on the sensor.

In some embodiments, the processor 102 is operative to control the fingerprint sensing system 100 such that the finger positions comprise information regarding an angle relative to a direction of extension of the sensor.

In some embodiments, the processor 102 is operative to control the fingerprint sensing system 100 such that any of the position guidance information and the initial position guidance information comprises displaying graphical information on a display.

The instructions that are executable by the processor 102 may be software in the form of a computer program 141. The computer program 141 may be contained in or by a carrier 142, which may provide the computer program 141 to the memory 106 and processor 102. The carrier 142 may be in any suitable form including an electronic signal, an optical signal, a radio signal or a computer readable storage medium.

What is claimed is:
1. A method in a fingerprint sensing system, the fingerprint sensing system comprising a two-dimensional fingerprint sensor, the method comprising:
obtaining initial fingerprint data,
calculating, based on the initial fingerprint data, a finger size of a finger of a user,
calculating, based on the finger size, an appropriate area of the finger for obtaining fingerprint enrollment data,
obtaining a plurality of finger positions, the finger positions being in relation to the sensor, providing, to the user, position guidance information for guiding the user to position the finger in relation to the sensor according to the finger positions, wherein the provision of the position guidance information is performed such that the finger positions are indicated to the user in a pseudo random order, obtaining, while providing the position guidance information, further fingerprint data from the sensor until an amount of fingerprint data has been obtained that exceeds a coverage threshold associated with the appropriate area of the finger, and calculating, based on any of the initial fingerprint data and the further fingerprint data, the fingerprint enrollment data.

2. The method of claim 1, wherein the obtaining of the initial fingerprint data comprises:
obtaining the initial fingerprint data from the sensor.

3. The method of claim 2, wherein the obtaining of the initial fingerprint data comprises:
obtaining a plurality of initial fingerprint data that correspond to at least a left position of the finger in relation to the sensor, a middle position of the finger in relation to the sensor and a right position of the finger in relation to the sensor,
calculating, based on the obtained plurality of initial fingerprint data, a finger width of the finger, and wherein the calculation of the finger size is based on the calculated finger width.

4. The method of claim 2, wherein the obtaining of the initial fingerprint data comprises:
obtaining a plurality of initial fingerprint data that correspond to at least an upper position of the finger in relation to the sensor, a middle position of the finger in relation to the sensor and a lower position of the finger in relation to the sensor,
calculating, based on the obtained plurality of initial fingerprint data, a spatial measure that is essentially perpendicular to a finger width of the finger, and wherein the calculation of the finger size is based on the spatial measure that is essentially perpendicular to a finger width.

5. The method of claim 3, comprising:
providing, to the user, initial position guidance information for guiding the user to position the finger in the middle position in relation to the sensor and, subsequently,
providing, to the user, initial position guidance information for guiding the user to position the finger in any of the left, the right, the upper and the lower position in relation to the sensor.

6. The method of claim 4, comprising:
providing, to the user, initial position guidance information for guiding the user to position the finger in the middle position in relation to the sensor and, subsequently,
providing, to the user, initial position guidance information for guiding the user to position the finger in any of the left, the right, the upper and the lower position in relation to the sensor.

7. The method of claim 3, comprising:
providing, to the user, initial position guidance information for guiding the user to swipe the finger in relation to the sensor.

8. The method of claim 4, comprising:
providing, to the user, initial position guidance information for guiding the user to swipe the finger in relation to the sensor.

9. The method of claim 3, comprising:
stitching the plurality of initial fingerprint data, resulting in a stitched fingerprint image,
calculating, based on the stitched fingerprint image, directions of stitching associated with the plurality of initial fingerprint data,
determining differences between the respective calculated directions of stitching, and wherein the calculation of the finger size comprises setting the finger size to a default finger size if at least one of said differences between the respective calculated directions of stitching is larger than a direction threshold value.

10. The method of claim 4, comprising:
stitching the plurality of initial fingerprint data, resulting in a stitched fingerprint image,
calculating, based on the stitched fingerprint image, directions of stitching associated with the plurality of initial fingerprint data,
determining differences between the respective calculated directions of stitching, and wherein the calculation of the finger size comprises setting the finger size to a default finger size if at least one of said differences between the respective calculated directions of stitching is larger than a direction threshold value.

11. The method of claim 1, wherein the obtaining of the initial fingerprint data comprises:
obtaining finger data from a touch sensitive two dimensional display, and wherein the calculation of the finger size is based on the obtained finger data.

12. The method of claim 1, wherein the obtaining of the initial fingerprint data comprises:
obtaining fingerprint characteristics in the form of any of:
at least one distance between at least two fingerprint reference points,
a spatial frequency of fingerprint ridges and valleys,
a number of fingerprint minutiae,
a measure of fingerprint valley curvature,
a measure of fingerprint ridge curvature, and wherein:
the calculation of the finger size comprises a calculation using any of the obtained fingerprint characteristics.

13. The method of claim 1, comprising:
determining, based on the plurality of finger positions, a first group of finger positions and a second group of finger positions, where:
the first group of finger positions is associated with a first estimated likelihood that the coverage threshold is reached within a specific number of steps of obtaining the further fingerprint data, and
the second group of finger positions is associated with a second estimated likelihood, lower than the first estimated likelihood, that the coverage threshold is reached within the specific number of steps of obtaining the further fingerprint data, and
wherein the pseudo random provision of the position guidance information is performed such that the first group of positions is provided prior to provision of the second group of positions.

14. The method of claim 1, wherein the finger positions comprise information regarding rectangular xy coordinates relative to a position on the sensor.

15. The method of claim 1, wherein the finger positions comprise information regarding an angle relative to a direction of extension of the sensor.

16. The method of claim 1, wherein any of the position guidance information and the initial position guidance information comprises displaying graphical information on a display.

17. A fingerprint sensing system, comprising a fingerprint sensor, a processor and a memory, said memory containing instructions executable by said processor whereby said processor is operative to control the fingerprint sensing system by:

obtaining initial fingerprint data, calculating, based on the initial fingerprint data, a finger size of a finger of a user, calculating, based on the finger size, an appropriate area of the finger for obtaining fingerprint enrollment data, obtaining a plurality of finger positions, the finger positions being in relation to the sensor, providing, to the user, position guidance information for guiding the user to position the finger in relation to the sensor according to the finger positions, wherein the provision of the position guidance information is performed such that the finger positions are indicated to the user in a pseudo random order, obtaining, while providing the position guidance information, further fingerprint data from the sensor until an amount of fingerprint data has been obtained that exceeds a coverage threshold associated with the appropriate area of the finger, and calculating, based on any of the initial fingerprint data and the further fingerprint data, the fingerprint enrollment data.

18. A communication device comprising the fingerprint sensing system of claim 17 and a touch sensitive display.

* * * * *